June 23, 1970  D. JOHNSON  3,516,880
FUEL UNIT FOR A GAS TURBINE POWER PLANT

Filed Dec. 12, 1966  2 Sheets-Sheet 1

INVENTOR
Douglas Johnson
BY
Paul Fitzpatrick
ATTORNEY

June 23, 1970　　　　D. JOHNSON　　　　3,516,880
FUEL UNIT FOR A GAS TURBINE POWER PLANT
Filed Dec. 12, 1966　　　　　　　　　　2 Sheets-Sheet 2

INVENTOR.
Douglas Johnson
BY
Paul Fitzpatrick
ATTORNEY

United States Patent Office
3,516,880
Patented June 23, 1970

3,516,880
FUEL UNIT FOR A GAS TURBINE POWER PLANT
Douglas Johnson, Indianapolis, Ind., assignor to General Motors Corporation, Detroit, Mich., a corporation of Delaware
Filed Dec. 12, 1966, Ser. No. 601,206
Int. Cl. C06b 19/00
U.S. Cl. 149—2
11 Claims

ABSTRACT OF THE DISCLOSURE

A gas turbine power plant of the recuperative closed circuit type for such uses as torpedo propulsion. The motive fluid is heated by an exothermic reaction of the thermite type. The reaction material is embodied in a chain of plates fed successively through a reaction chamber. The plates embody a refractory metal frame and contain a reinforcing and diluting content of quartz fibers.

---

My invention relates to gas turbine power plants and preferably to a closed circuit power plant. The principal object of my invention is to provide a power plant capable of delivering quite considerable total energy at a high rate for a limited period of time, which is of exceptionally light weight and small volume, and which is exceptionally silent. The particular use for which my invention is intended is a power plant for a self-propelled torpedo. Thus, the nature and characteristics of the power plant are such as to make it outstanding for propulsion of of torpedo. However, my invention is not limited to this application, and the power plant and various features thereof may have other important uses.

There are numerous factors that are important in rating a torpedo propulsion system. These include speed, which is primarily a function of the horsepower developed; secondly, range, which depends primarily upon the total energy available. Since the energy required to propel a torpedo a given distance increases with speed, range and speed are to some extent inverse factors. A third important item is depth capability. A torpedo which can deliver a given amount of energy or power at great depth is preferable to one whose performance is limited by or decreases with depth. A fourth important consideration is the presence or absence of a wake; that is, a visible indication such as air bubbles by which the course of the torpedo can be seen.

A fifth consideration is noise; this is extremely important in view of the use of listening devices for detecting the approach of torpedoes and determining their course. Beyond this it is obvious that a torpedo propulsion engine, including its source of energy, must be of relatively small volume and weight to be housed in the torpedo. Reliability, safety, and other factors are important in this particular field; cost is of secondary importance.

My invention provides a torpedo propulsion system which is outstanding with respect to the characteristics set out above. This advance in the art is due primarily to the use of a solid reaction material capable of liberating very considerable energy at high temperatures in connection with a closed circuit gas turbine system employing a motive fluid which is inert to the reaction material. More specifically, I employ a reaction of the thermite type conducted with improved materials or reaction units, which are to be described, to heat helium for use in a compact closed cycle gas turbine power lant. In this power plant a high level of energy and considerable endurance are available to provide high speed and range. Since the reaction is self-contained, there is no exhaust and therefore no wake, and performance is independent of depth. The combustion apparatus, turbine, and compressor are substantially noiseless and, by the use of improved reduction gearing, the entire power plant may operate at an exeremely low noise level. Also, there is no exhaust gas noise. Compactness and light weight in relation to power output are characteristic of gas turbine plants and the solid fuel energy source of my invention is also relatively compact.

A further important feaeure of my invention lies in my concept of a fuel as embodied in a chain of units, each unit comprising a high temperature resisting frame or support carrying a mixture of iron oxides and a metallic reducing agent such as aluminum or magnesium, mixed with quartz fibers to strengthen the fuel unit and control to some extent the temperature and rate of reaction. With this sort of heat source, helium gas employed in the power plant can be circulated directly over the reacting thermite mixture, keeping its temperature down to a level tolerable to the support for the reaction material, while at the same time providing by direct heat exchange a very high temperature flow of helium to the turbine.

The principal objects of my invention are to provide a power plant superior to those now available, for propulsion of torpedoes and for other uses; to provide a power plant for relatively short term operation having a high energy level, low weight, and compactness; to provide a very quiet power plant having no exhaust; to provide a new and superior solid fuel or reaction material for gas turbine power plants; to provide heating apparatus in which an inert gas is heated by direct contact with a composition of material undergoing an exothermic reaction which liberates no gas, and to provide a heat source embodied in a chain of exothermic fuel elements which may be fed succcessively through a reaction zone.

The nature of my invention and the advantages thereof will be clear to those skilled in the art from the succeeding detailed description of the preferred embodiment of the invention as a torpedo power plant. Referring to the drawings.

Figure 2:
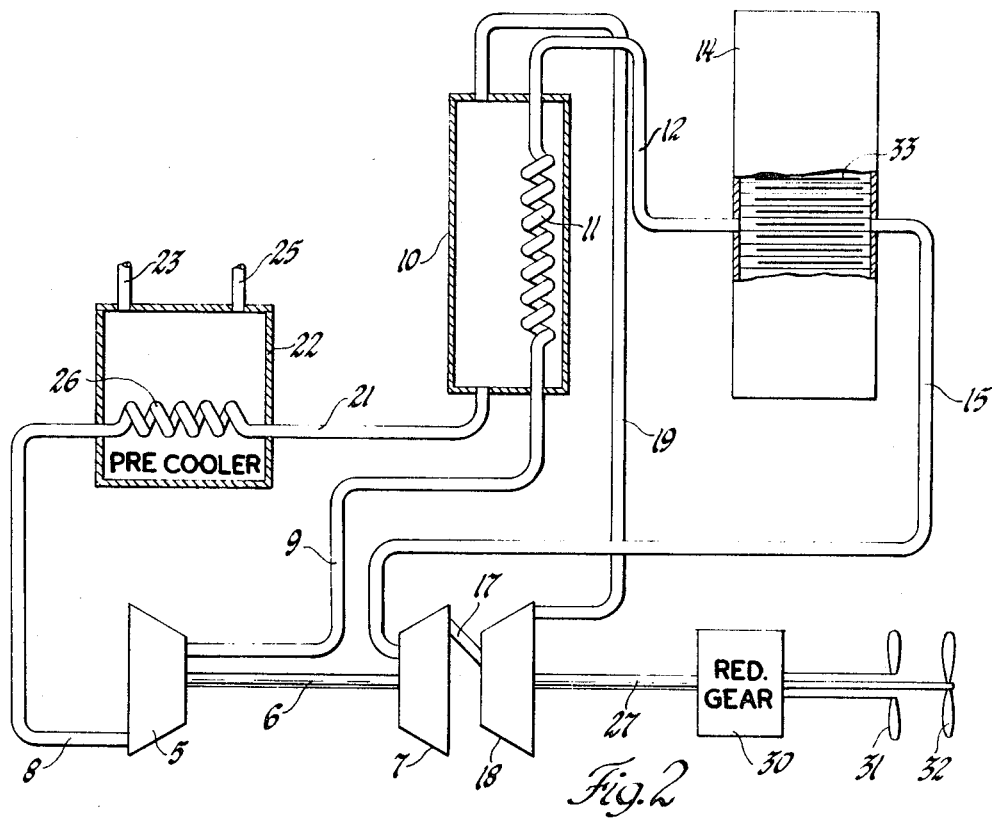
FIG. 2 is a schematic diagram of such a power plant.

Referring first to FIG. 2, a generally conventional closed circuit gas turbine system is illustrated. A compressor 5 is coupled by a shaft 6 to a high pressure turbine 7 which drives the compressor. A circulating gas, preferably helium, enters the compressor through a line 8 and is delivered through line 9 to a recuperator 10 within which the compressed gas is in heat exchange relation with turbine exhaust gas. The compressed gas may circulate through a coil 11 and through a conduit 12 to a reaction apparatus 14 within which the gas is further heated. The hot helium then flows through a conduit 15, turbine 7, an interconnecting duct 17, and a low pressure or power output turbine 18, from which it returns through exhaust line 19 to recuperator 10. After giving up heat to the compressed gas, the partly cooled helium flows through conduit 21 to a precooler 22 within which it is cooled by sea water circulated to the cooler through water lines 23 and 25. The helium flows through a coil 26 which in turn connects to compressor inlet line 8, completing the circuit.

The power turbine 18 is connected through a shaft 27 and reduction gearing 30 to coaxial shafts bearing counter-rotating screw propellers 31 and 32. So far as the general power system is concerned, this is a conventional closed circuit power plant, the basic difference being in the nature of the reaction apparatus 14 and the reaction elements 33, which will be further described.

Figure 1:
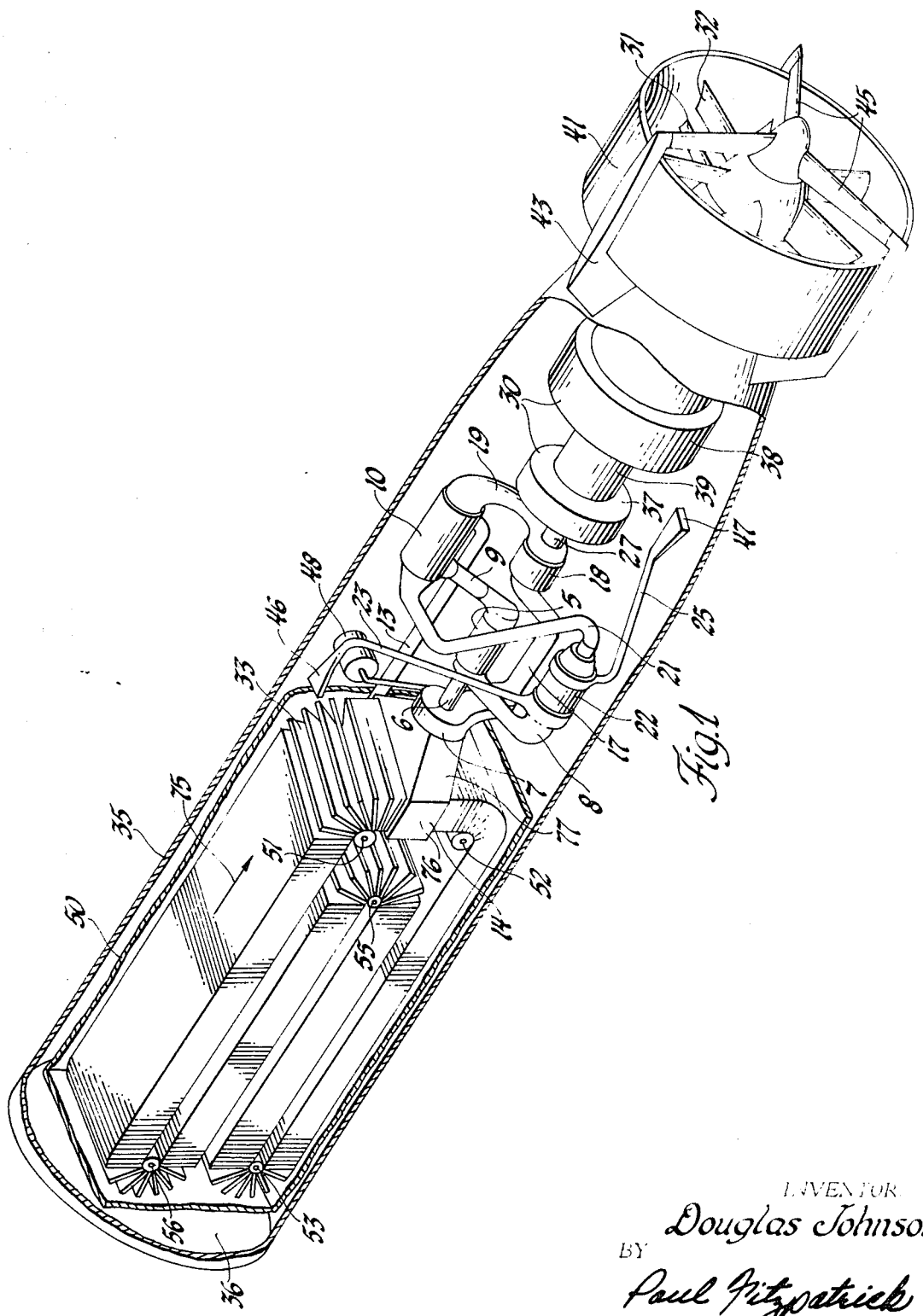
FIG. 1 is a somewhat schematic axonometric view of a torpedo power plant.

Proceeding to FIG. 1, a suitable arrangement of the components just referred to in a torpedo is illustrated. Here the aft part of the torpedo hull 35 defines a closed chamber 36 for the power plant and its reaction elements 33, which may be termed "fuel" for conciseness. The reduction gearing 30 which is driven by the power turbine through shaft 27 includes a first stage reduction gear 37 and a second stage reduction gear 38. These may be interconnected by an alternator 39 which provides power for the operation of steering gear and the like. The propellers 31 and 32 are enclosed in a shroud 41 connected to the torpedo hull by radial struts 43; steering vanes 45 are also supported by the struts. Preferably, the propellers are counter-rotating and are driven through a low noise-level friction type reduction gear so as to divide the torque evenly between the two. The cooling water for the precooler 22 is admitted through a forwardly facing inlet 46 projecting from the skin of the torpedo and is exhausted through a rearwardly facing outlet 47. An accumulator 48 contains helium gas for impingement starting of the turbine.

Proceeding to the fuel arrangement, the fuel elements 33 are in tabular form and are arranged in an endless chain or belt within a storage housing 50. As will be apparent, these elements 33 are guided over a roller 51 into the reaction apparatus 14 and proceed thence over rollers 52, 53, 55, and 56 so that the spent elements are returned to the housing 50.

Figure 3:
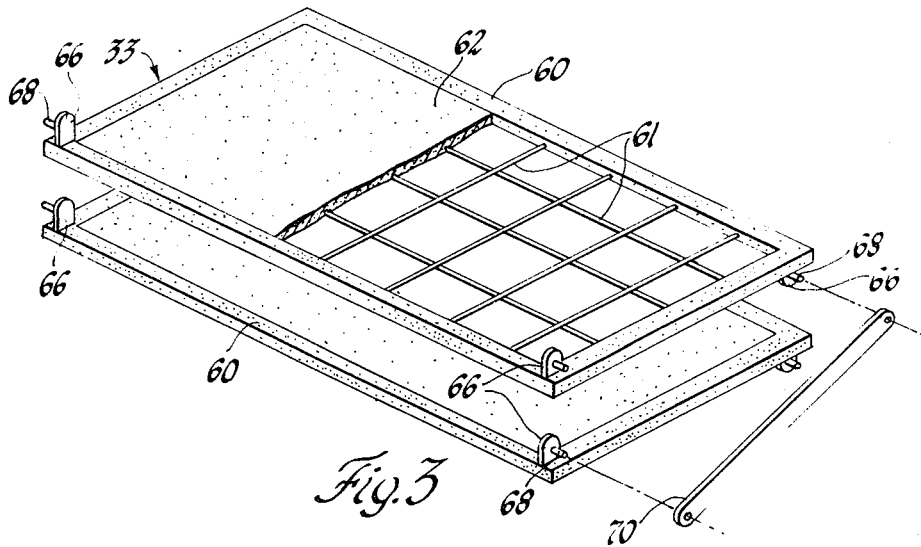
FIG. 3 illustrates two of the reaction units and the interconnection between the units.

The preferred structure of the fuel units 33 is illustrated in FIG. 3 from which it will be apparent that each unit 33 is a rectangular tabular or plate-like body. Each body includes a rectangular frame 60 of a high temperature ceramic material. A grid of crossed reinforcing wires 61 of tungsten or the like is bonded into the frame 60 before it is fired to provide a high temperature resisting framework for the heat release material. The body 62 of heat release material fills the space within the frame and preferably is bonded around the wires 61. This material may be any suitable exothermic mixture which does not liberate gas when the reaction takes place, and preferably one which remains solid, although it seems possible that a liquid reaction product could be disposed of satisfactorily within the housing. At any rate, the thermite compositions which are preferred provide a solid end product.

Thermite compositions may be defined generally as mixtures of metal oxides with metal reducing agents. Usually the oxide has a low heat of formation and the reducing agents are those which when oxidized have high heats of formation. The most commonly used reaction of this sort follows the equation $3Fe_3O_4 + 8Al \rightarrow 9Fe + 4Al_2O_3$ (5590° F.). Magnesium can be used instead of aluminum, and may be more desirable because of the high melting point of magnesium oxide. The heat release material thus includes a substantially stoichiometric mixture of finely powdered iron oxide and aluminum. Moreover, to further strengthen the heat release material and to lower to some extent the temperature developed rate of reaction, it is desirably mixed with a refractory reinforcing material which, as presently contemplated is preferably in the form of quartz fibers. The amount of such reinforcing and diluting material may be varied to suit the particular installation or characteristics desired. In the engine, the helium gas flows across the surface of the body of heat release material and limits the temperature preferably to about 3500° F.

It is important that the thermite powder be clean and free from adsorbed hydrogen and other contaminants to prevent popping and sputtering of metal onto adjacent structure. Once the material is installed in the torpedo it will be stored within a helium atmosphere and will not be exposed to contaminants.

In order to convey the fresh fuel units into the heat release apparatus and return the used ones to storage, they are connected together in a flexible chain by any suitable means, one such means being illustrated in FIG. 3. The frames 60 bear bosses 66 extending from the frame at each corner. These extend from opposite faces at the opposite edges of the frame. These bosses bear pivot pins 68 extending from them. Links 70 interconnect the bosses 66 of adjacent elements, being pivoted on the pins 68. Such links are provided at both ends of the frame, those at the rear end not being illustrated in FIG. 3. With this sort of connection the elements 33 can move together parallel or go around the rollers such as 51 and 52. The elements can fan out about either edge by pivoting of the links 70 at one or the other end.

Referring again to FIG. 1, the reaction units can be considered to be moving in the direction indicated by arrow 75 and thus downwardly through the reaction apparatus 14. Primarily, this apparatus provides a chamber through which the plates move and through which the helium delivered by pipe 13 into a plenum 76 ahead of the reaction units flows between the units and into a transition section 77 which connects to the inlet of first stage turbine 7. The reaction apparatus may be sealed to some extent from the storage housing 50 but preferably the housing 50 is maintained at or about normal turbine inlet pressure, which may be about 1600 p.s.i. and is filled with helium, so there is no leakage problem.

The reaction units 33 may be moved by any suitable means such as a motor (not illustrated) energized from the generator 39. Also, any suitable means for initiating the reaction may be provided. This requires heating of the mixture to about 1800° F., which is easily accomplished. For example, each fuel element may include a small electrically-initiated squib of the sort used for igniting rockets. Such a squib may be provided with contacts which engage fixed energized contacts in the reaction chamber (not illustrated) as the fuel elements move into position. It may also be feasible to ignite the first fuel element by any suitable means and depend upon heat radiated from one fuel element to the next to continue the reaction as successive fuel elements are brought into the reaction chamber.

My engine is intended primarily to deliver a high power output and my invention is not concerned with any means for modulating the power delivered. However, various means may be employed, such as bypassing the power turbine, varying the amount of water supplied to the precooler, or varying the rate of feed of the fuel elements to the reaction chamber.

It should be clear to those skilled in the art from the foregoing that my invention provides a power plant of unusual and highly desirable characteristics and a novel and useful heating apparatus for a power plant.

Certain subject matter disclosed herein, relating to the power plant organization as distinguished from the heat release units, is claimed in my divisional application Ser. No. 752,828 for Gas Turbine Power Plant, filed Aug. 15, 1968.

The detailed description of the prefered embodiment of the invention for the purpose of explaining the principles thereof is not to be considered as limiting the invention, since many modifications may be made by the exercise of skill in the art.

I claim:

1. A heat release unit for a power plant comprising, in combination,
   a refractory supporting framework and
   a body of heat release material supported by and exposed on the framework,
   the said body being a solid mixture of a thermite composition and a fibrous refractory diluting substance comprising quartz fibers effective to reinforce the heat release material and to retard the exothermic reaction of the thermite composition.

2. A heat release unit for a power plant comprising, in combination,
   a refractory supporting framework comprising a perimetric frame and a grid of wires extending across the frame and a body of heat release material supported by and exposed on the framework, the said body being a solid mixture of a thermite composition and a fibrous refractory diluting substance effective to reinforce the heat release material and to retard the exothermic reaction of the thermite composition.

3. A heat release unit as recited in claim 2 in which the frame is of a ceramic material.

4. A heat release unit as recited in claim 2 in which the wires are tungsten or a tungsten alloy.

5. The combination of a series of heat release units for a power plant connected together by pivotal joints to form a chain, each heat release unit comprising, in combination, a refractory supporting framework and a body of heat release material supported by and exposed on the framework, the said body being a solid mixture of a thermite composition and a fibrous refractory diluting substance effective to reinforce the heat release material and to retard the exothermic reaction of the thermite composition.

6. A combination as recited in claim 5 in which the thermite composition comprises aluminum.

7. A combination as recited in claim 5 in which the thermite composition comprises magnesium.

8. A combination as recited in claim 5 in which the diluting substance comprises quartz fibers.

9. A combination as recited in claim 5 in which the supporting framework comprises a perimetric frame and a grid of wires extending across the frame.

10. A combination as recited in claim 9 in which the frame is of a ceramic material.

11. A combination as recited in claim 9 in which the wires are tungsten or a tungsten alloy.

References Cited

UNITED STATES PATENTS

| 802,256 | 10/1905 | Bamberger et al. | 149—37 |
| 2,704,437 | 3/1955 | Thomsen | 60—37 |
| 3,224,199 | 12/1965 | Best. | |

FOREIGN PATENTS

| 892,141 | 3/1962 | Great Britain. |

SAMUEL FEINBERG, Primary Examiner

U.S. Cl. X.R.

60—50, 59; 149—17, 37